US008586162B2

(12) United States Patent
Suzuki et al.

(10) Patent No.: US 8,586,162 B2
(45) Date of Patent: Nov. 19, 2013

(54) ELECTROCONDUCTIVE ENDLESS BELT

(75) Inventors: Takahiro Suzuki, Kodaira (JP); Kunio Machida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 505 days.

(21) Appl. No.: 12/864,106

(22) PCT Filed: Jan. 23, 2009

(86) PCT No.: PCT/JP2009/051091
§ 371 (c)(1),
(2), (4) Date: Jul. 22, 2010

(87) PCT Pub. No.: WO2009/093697
PCT Pub. Date: Jul. 30, 2009

(65) Prior Publication Data
US 2010/0290809 A1  Nov. 18, 2010

(30) Foreign Application Priority Data

Jan. 25, 2008 (JP) .................................. 2008-015515
Nov. 6, 2008 (JP) .................................. 2008-285223

(51) Int. Cl.
| | |
|---|---|
| B32B 25/08 | (2006.01) |
| B32B 25/14 | (2006.01) |
| B32B 27/18 | (2006.01) |
| B32B 27/36 | (2006.01) |
| G03G 13/14 | (2006.01) |
| G03G 13/20 | (2006.01) |
| G03G 15/14 | (2006.01) |
| G03G 15/20 | (2006.01) |
| C08G 63/16 | (2006.01) |
| C08G 63/189 | (2006.01) |
| C08G 63/181 | (2006.01) |
| C08G 63/183 | (2006.01) |
| C08G 63/187 | (2006.01) |

(52) U.S. Cl.
USPC ....... 428/36.8; 428/34.1; 428/35.7; 428/36.9; 428/480; 399/302; 399/308; 399/328; 399/329; 430/124.3; 430/124.32; 430/125.3; 430/125.32; 525/437; 525/444

(58) Field of Classification Search
None
See application file for complete search history.

(56) References Cited

U.S. PATENT DOCUMENTS 3,907,926 A  *  9/1975  Brown et al. ................. 524/258
4,080,354 A  *  3/1978  Kramer ......................... 523/522
(Continued)

FOREIGN PATENT DOCUMENTS

JP  6-149081 A  5/1994
JP  8-99374 A  4/1996
(Continued)

OTHER PUBLICATIONS

"Polybutylene Terephthalate"—Wikipedia (http://en.wikipedia.org/wiki/Polybutylene_terephthalate) retrieved Sep. 9, 2012.*

(Continued)

*Primary Examiner* — Vivian Chen
(74) *Attorney, Agent, or Firm* — Sughrue Mion, PLLC (57) ABSTRACT

The present invention is an electroconductive endless belt used in an image forming apparatus in which a decrease with use in the gloss value caused by frictions and the like with papers and cleaning blade is suppressed. In the electroconductive endless belt, the base resin of the electroconductive endless belt comprises a polyalkylene terephthalate resin in combination with a naphthalene ring-containing thermoplastic resin and/or a naphthalene ring-containing thermoplastic elastomer having a melting point higher than that of the polyalkylene terephthalate resin, and the mass ratio of the polyalkylene terephthalate resin to the naphthalene ring-containing thermoplastic resin and/or the naphthalene ring-containing thermoplastic elastomer in the base resin is in the range of 90/10 to 50/50.

14 Claims, 2 Drawing Sheets

(a)

(b)

(56) References Cited

U.S. PATENT DOCUMENTS

| | | | |
|---|---|---|---|
| 6,184,410 B1* | 2/2001 | Bollmann et al. | 560/26 |
| 7,740,778 B2* | 6/2010 | Tanaka | 264/105 |
| 8,095,055 B2* | 1/2012 | Suzuki | 399/308 |
| 8,119,252 B2* | 2/2012 | Ueno et al. | 428/480 |
| 2006/0172097 A1* | 8/2006 | Morikoshi et al. | 428/35.7 |
| 2007/0116958 A1* | 5/2007 | Suzuki et al. | 428/411.1 |
| 2007/0178254 A1* | 8/2007 | Shimomura | 428/32.51 |
| 2007/0286957 A1* | 12/2007 | Suzuki et al. | 427/372.2 |
| 2009/0074480 A1* | 3/2009 | Suzuki | 399/308 |
| 2010/0158584 A1* | 6/2010 | Ueno et al. | 399/313 |
| 2011/0033205 A1* | 2/2011 | Suzuki et al. | 399/162 |

FOREIGN PATENT DOCUMENTS

| | | | |
|---|---|---|---|
| JP | 2000-335773 | * | 12/2000 |
| JP | 2001-018284 | * | 1/2001 |
| JP | 2002-132053 A | | 5/2002 |
| JP | 2003-029537 | * | 1/2003 |
| JP | 2004-258153 | * | 9/2004 |
| JP | 2005-266760 | * | 9/2005 |
| JP | 2005-266760 A | | 9/2005 |
| JP | 2006-139206 | * | 6/2006 |
| JP | 2006-233150 A | | 9/2006 |
| JP | 2007-25130 A | | 2/2007 |
| JP | 2007-025131 | * | 2/2007 |
| JP | 2007-25131 A | | 2/2007 |
| JP | 2007-47772 A | | 2/2007 |
| JP | 2007-52118 A | | 3/2007 |
| JP | 2007-65587 A | | 3/2007 |
| WO | WO 2007/015422 | * | 2/2007 |

OTHER PUBLICATIONS

Extended European Search Report issued Apr. 17, 2012, in European Patent Application No. 09703888.9.
International Search Report dated Feb. 17, 2009.

* cited by examiner

ELECTROCONDUCTIVE ENDLESS BELT

TECHNICAL FIELD

The present invention relates to an electroconductive endless belt (hereinafter, also simply referred to as "belt") used to transfer a toner image onto a recording medium, such as paper, in an electrostatic recording process performed in an electrophotographic apparatus or an electrostatic recording apparatus, such as a copy machine or printer, which toner image is formed by providing a developer onto the surface of an image-forming member such as a latent image-retaining member retaining an electrostatic latent image on its surface.

BACKGROUND ART

In an electrostatic recording process performed by a copy machine, printer or the like, conventionally, printing is carried out by a method comprising the steps of: first, uniformly charging the surface of a photoconductor (latent image-retaining member); projecting from an optical system an image onto this photoconductor; removing the charge from the part exposed to light to form an electrostatic latent image; subsequently providing a toner to the thus formed electrostatic latent image to form a toner image by electrostatic adsorption of the toner; and transferring the thus formed toner image onto a recording medium such as paper, OHP or photographic paper.

Also in a color printer and color copy machine, printing is performed basically in accordance with the aforementioned process; however, in the case of color printing, since color tones are reproduced by using four toners of magenta, yellow, cyan and black, it is necessary to carry out a step of overlaying these toners at a prescribed ratio to obtain desired color tones. Several techniques have been proposed for performing this step.

The first example of such technique is image-on-image development method. In this method, for visualization of an electrostatic latent image formed on a photoconductor by providing toners, an image is, in the same manner as in black-and-white printing, developed by sequentially overlaying the aforementioned four toners of magenta, yellow, cyan and black, thereby forming a color toner image on the photoconductor. This method enables a relatively compact apparatus configuration; however, it has a problem in that a high quality image cannot be obtained since gradation control is extremely difficult.

The second example of the aforementioned proposed technique is tandem method. In this method, a color image is reproduced by the steps of: developing latent images on each of four photoconductor drums using magenta toner, yellow toner, cyan toner and black toner to form each toner image by magenta, yellow, cyan and black; and sequentially transferring the toner images thus formed on the photoconductor drums, which are configured in a line, onto a recording medium such as paper to overlay the toner images on a recording medium. This method provides a good quality image; however, the apparatus is large and expensive since the four photoconductor drums, each of which has a charging mechanism and a developing mechanism, have to be configured in a line.

Figure 2:
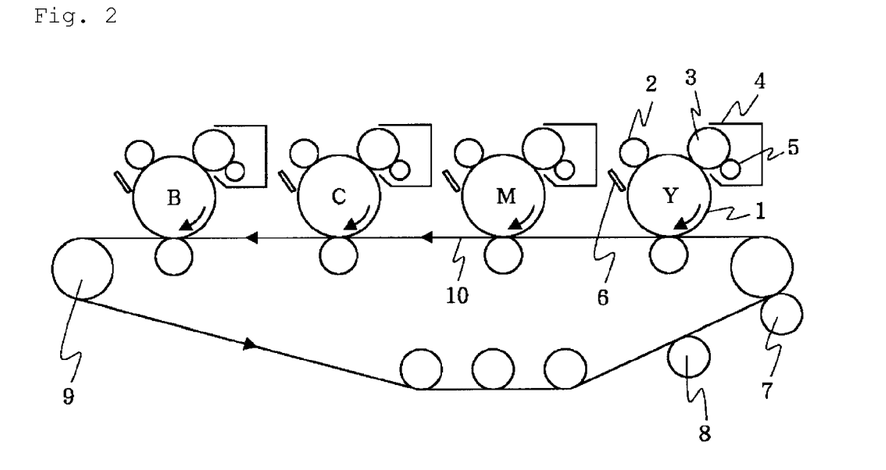
FIG. 2 is a schematic view showing an image forming apparatus of tandem method using a transfer conveyer belt, as one example of the image forming apparatus according to the present invention.

Illustrated in FIG. 2 is an example of the constitution of a printing unit of an image-forming apparatus used in such tandem method. The printing unit has four printing units aligned sequentially corresponding to each toner of yellow (Y), magenta (M), cyan (C) and black (B), each printing unit of which is constituted by a photoconductor drum 1, a charging roller 2, a developing roller 3, a developing blade 4, a toner feeding roller 5 and a cleaning blade 6. The toners are sequentially transferred onto a sheet as it is carried by a transfer conveyer belt 10, which is circularly driven by driving rollers (driving member) 9, thereby forming a color image. Charging of the transfer conveyer belt and charge-removal therefrom are carried out by a charging roller 7 and a charge-removing roller 8, respectively. In addition, an adsorption roller (not shown) is used to charge the sheet in order to allow the sheet to adsorb onto the belt. By having such the above constitution, generation of ozone can be suppressed. The adsorption roller not only transfers the sheet from a sheet feeding path to the transfer conveyer belt, but also performs electrostatic adsorption of the sheet onto the transfer conveyer belt. Further, separation of the sheet therefrom after image transfer can be carried out solely by self stripping since the adsorption force between the sheet and the transfer conveyer belt becomes low by lowering the transfer voltage.

The material of the transfer conveyer belt 10 may be resistive or dielectric; however, each material type has its advantages and disadvantages. Since a resistive belt retains charges for only a short duration, in cases where such resistive belt is employed for the tandem-type transfer, there is only a limited amount of charge injection during the transfer and the increase in the voltage is relatively small even when four colors are consecutively transferred. Furthermore, even in cases where the resistive belt is repeatedly employed to consecutively transfer sheets, it is not required to electrically reset the belt since charges thereon should have been already released by the time of transferring the next sheet. However, such resistive belt has disadvantages in that the transfer efficiency is affected by environmental variations as the resistance value varies depending on the environmental variations, and that it is likely to be affected by the thickness and width of the printing sheet.

In contrast, a dielectric belt does not spontaneously release injected charges; therefore, injection and release of charges have to be controlled electronically. However, since the charges are stably retained by the belt, sheet adsorption is assured and sheet transfer is performed at a high accuracy. In addition, as the dielectric constant is less dependent on the temperature and humidity, the transfer process is relatively stable against environmental variations as well. A disadvantage of such dielectric belt is that charges are accumulated from repeated transfers, thereby increasing the transfer voltage.

The third example of the aforementioned proposed technique is transfer drum method in which a color image is reproduced by rotating a transfer drum, which is lapped with a recording medium such as paper, four times, in each of which rotation magenta, yellow, cyan and black toners on a photoconductor are sequentially transferred onto the recording medium. This method yields an image having a relatively high quality; however, in cases where the recording medium is a thick paper such as a postcard, since lapping of such recording medium around the transfer drum is difficult, this method has a problem in that the type of the recording medium is limited.

As an alternative method to the aforementioned image-on-image development method, tandem method and transfer drum method, intermediate transfer method, which yields a good quality image without particularly increasing the size of the apparatus and limiting the type of the recording medium, has been proposed.

That is, in this intermediate transfer method, an intermediate transfer member comprising a drum and a belt which transfer and temporarily retain a toner image formed on a photoconductor is provided, and around this intermediate transfer member, four photoconductors each having a toner image with magenta, a toner image with yellow, a toner image with cyan and toner image with black are arranged. The toner images of four colors are sequentially transferred onto the intermediate transfer member from the photoconductors, thereby forming a color image on this intermediate transfer member, which color image is then transferred onto a recording medium such as paper. Therefore, since the gradation is adjusted by overlaying the toner images of four colors, a high quality image can be obtained. At the same time, the apparatus does not have to be particularly scaled up since there is no need to linearly arrange the photoconductors as in the case of tandem method, and the type of recording medium is not restricted as the recording medium does not have to be lapped around the drum.

Figure 3:
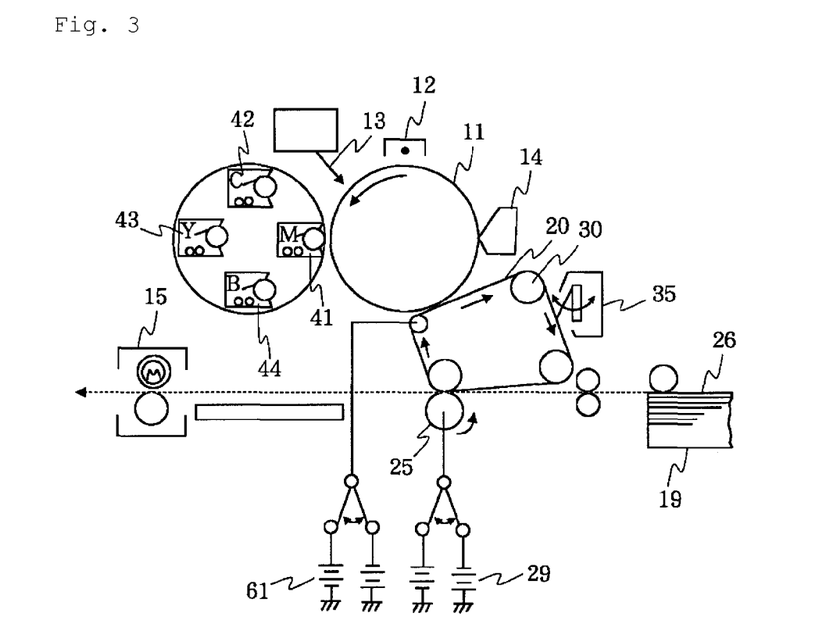
FIG. 3 is a schematic view showing an intermediate transfer apparatus using an intermediate transfer member, as another example of the image forming apparatus according to the present invention.

As an apparatus to perform color-image formation by such intermediate transfer method, FIG. 3 illustrates an image forming apparatus which comprises an intermediate transfer member in the form of an endless belt.

In FIG. 3, indicated as 11 is a drum photoconductor which rotates in the direction of the arrow. This photoconductor 11 is charged by a primary charging unit 12 and an image exposure unit 13 subsequently removes the charge from the part exposed to light, forming an electrostatic latent image corresponding to a first color component onto the photoconductor 11. By a developing unit 41, the thus formed electrostatic latent image is then developed with the first color, magenta toner (M), to form a toner image of the first color, magenta, onto the photoconductor 11. Subsequently, this toner image is transferred onto an intermediate transfer member 20, which is being circularly rotated in contact with the photoconductor 11 by a driving roller (driving member) 30. In this step, the image transfer from the photoconductor 11 onto the intermediate transfer member 20 is carried out at the nip portion between the photoconductor 11 and the intermediate transfer member 20 by primary transfer bias applied from a power source 61 to the intermediate transfer member 20. After the transfer of the toner image of the first color, magenta, onto this intermediate transfer member 20, the surface of the aforementioned photoconductor 11 is cleaned by a cleaning unit 14, thereby completing the first round of the image development and transfer operation by the photoconductor 11. In each of the subsequent three rotations of the photoconductor, by sequentially using developing units 42 to 44, a toner image of second color, cyan; a toner image of third color, yellow; and a toner image of fourth color, black, are sequentially formed onto the photoconductor 11 and superimposed onto the intermediate transfer member 20. Consequently, a composite color toner image corresponding to the desired color image is formed onto the intermediate transfer member 20. In the apparatus shown in FIG. 3, after each rotation of the photoconductor 11, the developing units 41 to 44 are sequentially placed into the position to perform sequential development by the magenta toner (M), cyano toner (C), yellow toner (Y), and black toner (B).

In the next step, the intermediate transfer member 20 onto which the aforementioned composite color toner image has been formed comes in contact with a transfer roller 25, and to the nip portion thereof, a recording medium 26 such as paper is fed from a paper feeding cassette 19. Simultaneously, secondary transfer bias is applied from a power source 29 to the transfer roller 25 and the composite color toner image is transferred and heat-fixed onto the recording medium 26 from the intermediate transfer member 20, thereby forming a final image. After the transfer of the composite color toner image onto the recording medium 26, residual toners on the surface of the intermediate transfer member 20 are removed by a cleaning unit 35 to return the intermediate transfer member 20 to the initial condition for the next image formation process.

Figure 4:
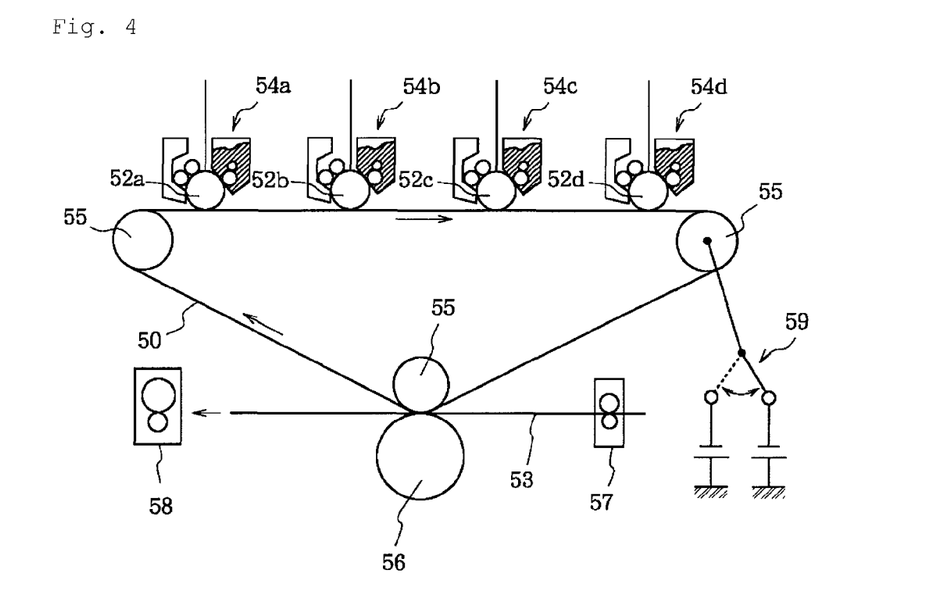
FIG. 4 is a schematic view showing an intermediate transfer apparatus using an intermediate transfer member, as another example of the image forming apparatus according to the present invention.

There is also an intermediate transfer method combined with the tandem method. FIG. 4 illustrates an image forming apparatus of intermediate transfer method in which color images are formed using an intermediate transfer member in the form of an endless belt.

In the illustrated apparatus, a first developing unit 54a to a fourth developing unit 54d, which develop electrostatic latent images on photoconductor drums 52a to 52d with yellow, magenta, cyan and black, respectively, are sequentially arranged along an intermediate transfer member 50. This intermediate transfer member 50 is circularly driven in the direction of the arrow, and thereonto, toner images of four colors that have been formed on each of the photoconductor drums 52a to 52d of developing units 54a to 54d are sequentially transferred, thereby forming a color toner image onto this intermediate transfer member 50. The thus formed color toner image is then transferred onto a recording medium 53, such as paper, to be printed out. In any of the aforementioned apparatuses, the sequence of the toners used in the image development is not particularly restricted and can be arbitrarily selected.

In FIG. 4, the symbol 55 represents a driving roller or tension roller for circularly driving the intermediate transfer member 50, and the symbols 56 and 57 represent a recording medium feeding roller and recording medium feeding device, respectively, while the symbol 58 represents a fixing device which fixes an image on a recording medium by heating or the like. Further, the symbol 59 represents a power source unit (voltage applying means) which applies a voltage to the intermediate transfer member 50. This power source device 59 can reverse the positive and negative of the voltage to be applied between when transferring toner images to the aforementioned intermediate transfer member 50 from the photoconductor drums 52a to 52d and when transferring the thus formed color toner image from the intermediate transfer member 50 to the recording medium 53.

Conventionally, for the electroconductive endless belt used as the transfer conveyer belt 10 and intermediate transfer members 20 and 50 and the like, semi-conductive resin film belts or rubber belts having a fiber-reinforced member body have been mainly used. Among such resin film belts, for example, those of which polycarbonate (PC) is mixed with carbon black, those comprising a polyalkylene terephthalate as the principal resin, and those comprising a thermoplastic polyimide as the principal resin, are known.

In addition, for example, Patent Document 1 discloses an unstretched seamless belt comprising a thermoplastic polyalkylene terephthalate and carbon black. Further, Patent Document 2 discloses a seamless belt which comprises a resin composition obtained by adding a functional component to a resin component containing a polyalkylene terephthalate (PAT) in combination with a thermoplastic elastomer having a melting point of not lower than 100° C. and not higher than that of the PAT and a compatibility parameter difference from that of the PAT by less than 2.0. Still further, Patent Document 3 discloses an electroconductive endless belt which contains a thermoplastic polyalkylene naphthalate resin, a base material of other thermoplastic resin having an ester bond, and an electroconductive material, which electroconductive endless belt has a prescribed MFR value of the thermoplastic resin having an ester bond at 270° C. and a prescribed weight ratio between the thermoplastic polyalkylene naphthalate resin and the thermoplastic resin having an ester bond.

Patent Document 1: Japanese Unexamined Patent Application Publication No. 06-149081 (the claims and the like)
Patent Document 2: Japanese Unexamined Patent Application Publication No. 08-099374 (the claims and the like)
Patent Document 3: Japanese Unexamined Patent Application Publication No. 2005-266760 (the claims and the like)

DISCLOSURE OF THE INVENTION

Problems to be Solved by the Invention

In the aforementioned Patent Document 1, it is disclosed that a belt having a superior durability can be obtained by using a polybutylene terephthalate (PBT) among polyalkylene terephthalates. However, the belt according to Patent Document 1 was not satisfactory because there was a large decrease in the gloss value due to the friction between the belt and the printing paper when the belt was used as a transfer conveyer belt, and because there was also a large decrease in the gloss value due to the friction between the belt and the cleaning blade when the belt was used as intermediate transfer belt. Furthermore, in the technique according to Patent Document 2, compared to when a polyalkylene terephthalate is used solely, a belt having a superior durability can be obtained by using a resin component which comprises a thermoplastic elastomer having a good compatibility with polyalkylene terephthalates; however, the belt was not satisfactory in terms of the abrasion resistance.

In view of the above, an object of the present invention is to provide an electroconductive endless belt solving the aforementioned problems, in which belt a decrease with use in the gloss value caused by frictions and the like with papers and cleaning blade is suppressed.

Means for Solving the Problems

In order to solve the aforementioned problems, the present inventors intensively studied to discover that the aforementioned problems can be resolved by using, as the base resin of the belt, a polyalkylene terephthalate resin in combination with a thermoplastic resin and/or a thermoplastic elastomer having a naphthalene ring and a melting point higher than that of the polyalkylene terephthalate resin, thereby completing the present invention.

That is, the present invention is an electroconductive endless belt used in an image forming apparatus, wherein base resin of the electroconductive endless belt comprises a polyalkylene terephthalate resin in combination with a naphthalene ring-containing thermoplastic resin and/or a naphthalene ring-containing thermoplastic elastomer having a melting point higher than that of the polyalkylene terephthalate resin, wherein the mass ratio of the polyalkylene terephthalate resin to the naphthalene ring-containing thermoplastic resin and/or the naphthalene ring-containing thermoplastic elastomer in the base resin is in the range of 90/10 to 50/50.

In the present invention, the aforementioned polyalkylene terephthalate resin is preferably a polybutylene terephthalate (PBT) resin and the aforementioned naphthalene ring-containing thermoplastic resin is preferably a polybutylene naphthalate (PBN) resin. Further, as the aforementioned naphthalene ring-containing thermoplastic elastomer, polyester-based elastomers can be preferably used. Furthermore, it is preferred that the electroconductive endless belt according to the present invention contain a carbodiimide compound.

Effects of the Invention

According to the present invention, by having the aforementioned constitution, an electroconductive endless belt in which a decrease with use in the gloss value caused by frictions and the like with papers and cleaning blade is suppressed can be provided. Specifically, the flexibility of the belt can be improved when a polyalkylene terephthalate resin and a naphthalene ring-containing thermoplastic elastomer having a melting point higher than that of the polyalkylene terephthalate resin are used in combination. The flexibility of the belt can be further improved by additionally blending a carbodiimide compound.

| DESCRIPTION OF SYMBOLS | |
|---|---|
| 1, 11, 52a to 52d: | Photoconductor drum |
| 2, 7: | Charging roller |
| 3: | Developing roller |
| 4: | Developing blade |
| 5: | Toner feeding roller |
| 6: | Cleaning blade |
| 8: | Charge-removing roller |
| 9, 30, 55: | Driving roller (driving member) |
| 10: | Transfer conveyer belt |
| 12: | Primary charging unit |
| 13: | Image exposure unit |
| 14, 35: | Cleaning unit |
| 19: | Paper feeding cassette |
| 20: | Intermediate transfer member |
| 25: | Transfer roller |
| 26, 53: | Recording medium |
| 29, 61: | Power source |
| 41, 42, 43, 44: | Developing unit |
| 50: | Tandem intermediate transfer member |
| 54a to 54d: | First to fourth developing units |
| 56: | Recording medium feeding roller |
| 57: | Recording medium feeding device |
| 58: | Fixing device |
| 59: | Power source unit (voltage applying means) |

BEST MODE FOR CARRYING OUT THE INVENTION

Preferred embodiments of the present invention will be described in detail.

Electroconductive endless belts are generally grouped into jointed belts and jointless belts (so-called seamless belts). The present invention can be either of them; however, it is preferably a seamless belt. As already described, the electroconductive endless belt according to the present invention can be used as a transfer member or the like in image forming apparatuses of the tandem method and intermediate transfer method.

In cases where the electroconductive endless belt of the present invention is, for example, the transfer conveyer belt represented by the reference symbol 10 in FIG. 2, the belt is driven by a driving member such as the driving roller 9 and toners are sequentially transferred onto a recording medium as the recording medium is carried by the belt, thereby forming a color image.

Further, in cases where the electroconductive endless belt of the present invention is, for example, the intermediate transfer member represented by the reference symbol 20 in FIG. 3, by arranging the intermediate transfer member, which is circularly driven by a driving member such as the driving roller 30, between the photoconductor drum (latent image-retaining member) 11 and the recording medium 26 such as paper, a toner image formed on the surface of the aforementioned photoconductor drum 11 is transferred and temporarily retained on the intermediate transfer member 20 and subsequently transferred onto the recording medium 26. As already described, the apparatus of FIG. 3 performs color printing by the intermediate transfer method.

Furthermore, in cases where the electroconductive endless belt of the present invention is, for example, the intermediate transfer member represented by the reference symbol 50 in FIG. 4, by arranging the intermediate transfer member, which is circularly driven by a driving member such as the driving roller 55, between the developing units 54a to 54d equipped with the photoconductor drums 52a to 52d and the recording medium 53 such as paper, toner images of four colors formed onto the surface of each of the photoconductor drums 52a to 52d are transferred and temporarily retained and subsequently transferred onto the recording medium 53, thereby forming a color image. Explained in the above is concerning the cases where toners of four colors are used; however, it is needless to say that toners are not restricted to four colors in any of the aforementioned apparatuses.

The electroconductive endless belt of the present invention is characterized in that the base resin thereof comprises a polyalkylene terephthalate resin in combination with a naphthalene ring-containing thermoplastic resin and/or a naphthalene ring-containing thermoplastic elastomer having a melting point higher than that of the aforementioned polyalkylene terephthalate resin. The use of a polyalkylene terephthalate resin in combination with a naphthalene ring-containing resin and an elastomer having a high melting point enabled an improvement in the abrasion resistance of the belt and suppression of a decrease in the gloss value caused by frictions with papers and cleaning blade. Here, the reason why an elastomer having a melting point higher than that of the thermoplastic polyalkylene terephthalate resin which is used in combination is used as the naphthalene ring-containing elastomer is not only because it is compatible with the principal material, which is polyalkylene terephthalate resin, for having a small difference in the viscosity in melting therewith, but also because it is advantageous in dispersing additives, such as inorganics, as the viscosity of the entire resin can be maintained at a high level. In other words, generally speaking, the melt viscosity of elastomers is often lower than that of a polyalkylene terephthalate resin preferably used in the belt at the same temperature. If the melting point of the elastomer is lower than that of the polyalkylene terephthalate resin, the temperature difference during melt-mixing would be large, thereby deteriorating the compatibility. To counter this, an elastomer having a melting point higher than that of polyalkylene terephthalate resin is used to decrease the temperature difference during melt-mixing, thereby enabling to improve the compatibility. In addition, such elastomer is advantageous in dispersing additives such as inorganics, since the viscosity of the entire resin can be maintained at a high level.

Examples of the thermoplastic polyalkylene terephthalate resin used in the present invention include PBT resins, polyethylene terephthalate (PET) resins and glycol-modified polyethylene terephthalate (PETG) resins; however, a PBT resin is preferably used.

Further, the naphthalene ring-containing thermoplastic resin used in the present invention is not particularly restricted as long as it has a naphthalene ring in the skeleton, and any such resin may be used. In addition, the naphthalene ring-containing thermoplastic elastomer, too, is not particularly restricted as long as it has a melting point higher than that of the aforementioned thermoplastic polyalkylene terephthalate resin and a naphthalene ring in the skeleton, and any such resin may be used. In this case, a hydrogen atom of the naphthalene ring is optionally substituted with a substituent such as a hydroxyl group, carboxyl group or amino group, and the resin may have a 5-membered ring in its structure or may be hydrogenated. In cases where a naphthalene ring-containing elastomer having a high melting point among such resins is used in combination with a thermoplastic polyalkylene terephthalate resin, the flexibility and the gloss value of the belt can be improved, while in cases where a naphthalene ring-containing resin is used in combination with a thermoplastic polyalkylene terephthalate resin, a decrease in the gloss value can be suppressed without lowering the elastic modulus. Furthermore, by using both a naphthalene ring-containing resin and a naphthalene ring-containing elastomer having a high melting point in combination with a thermoplastic polyalkylene terephthalate resin, it becomes possible to adjust the flexibility and elastic modulus at a desired level and a decrease in the gloss value can be suppressed as well.

Specific examples of the naphthalene ring-containing thermoplastic resin include polybutylene naphthalate (PBN) resins and polyethylene naphthalate (PEN) resins, and a PBN resin is preferably used. Further, examples of the naphthalene ring-containing thermoplastic elastomer include polyester-based elastomers. As the polyester-based elastomer, those of polyester-polyester type using polyesters for the hard and soft segments, as well as those of polyester-polyether type using a polyester for the hard segment and a polyether for the soft segment, may both be preferably used. Generally, the hard segment of polyester-based elastomers contains PBT or PBN as the principal component and although both types of polyester-based elastomer can be used, a naphthalene ring-containing PBN is preferred in order to simultaneously attain an improved flexibility and suppressed decrease in the gloss value.

Further, in the electroconductive endless belt of the present invention, the mass ratio of the thermoplastic polyalkylene terephthalate resin to the naphthalene ring-containing thermoplastic resin and/or the naphthalene ring-containing thermoplastic elastomer in the base resin is in the range of 90/10 to 40/60, preferably in the range of 90/10 to 50/50. In cases where the content of the naphthalene ring-containing thermoplastic resin and/or the naphthalene ring-containing thermoplastic elastomer is too low, the effect of suppressing a decrease in the gloss value cannot be sufficiently attained. In contrast, in cases where the base resin contains only a naphthalene ring-containing thermoplastic resin, the flexibility would be insufficient, and the tensile elastic modulus would be insufficient in cases where the base resin contains only a naphthalene ring-containing thermoplastic elastomer.

The polyester-based materials such as the thermoplastic polyalkylene terephthalate resin used as the base resin in the present invention have a problem in that they are likely to cause a decrease in the molecular weight due to hydrolysis during heat-molding. Therefore, in the belt according to the present invention, it is preferred to suppress such decrease in the molecular weight by adding a compound having a carbodiimide group and allowing the polyester-based material to be re-cross-linked by reaction between the carbodiimide group and carboxylic acid. By doing so, embrittlement of the belt can be prevented and the cracking resistance of the belt under intensive use can be improved. Such carbodiimide compound is readily available in the market and examples thereof include CARBODILITE (trade name) manufactured by Nisshinbo Holdings Inc. or the like. In addition, such carbodiimide compound can also be used in the form of a pellet masterbatched in advance or the like and, for example, CARBODILITE E-pellet (trade name) and CARBODILITE B-pellet (trade name) manufactured by Nisshinbo Holdings Inc. may be preferably used.

The amount of such carbodiimide compound used is not particularly restricted; however, it is preferably 0.05 to 30 parts by mass, more preferably in the range of 0.1 to 5 parts by mass, with respect to 100 parts by mass of the base resin.

Further, in order to adjust the electroconductivity, a conductive agent is appropriately blended in the belt of the present invention. Such conductive agent is not particularly restricted, and a known electroconductive agent, ionic conductive agent or the like may be appropriately used.

Thereamong, specific examples of the electroconductive agent include electroconductive carbons such as ketjen black and acetylene black; carbons for rubber such as SAF, ISAF, HAF, FEF, GPF, SRF, FT and MT; oxidation-treated carbons for color (ink); pyrolytic carbons; natural graphite; artificial graphite; metals and metal oxides such as antimony-doped tin oxide, titanium oxide, zinc oxide, nickel, copper, silver, and germanium; electroconductive polymers such as polyaniline, polypyrrole, and polyacetylene; and electroconductive whiskers such as carbon whisker, graphite whisker, titanium carbide whisker, electroconductive potassium titanate whisker, electroconductive barium titanate whisker, electroconductive titanium oxide whisker, and electroconductive zinc oxide whisker. Further, specific examples of the ionic conductive agent include ammonium salts of perchlorates, chlorates, hydrochlorides, bromates, iodates, tetrafluoroborates, sulfates, ethylsulfates, carboxylates, and sulfonates, such as tetraethylammonium, tetrabutylammonium, dodecyltrimethylammonium, hexadecyltrimethylammonium, benzyltrimethylammonium, and modified fatty acid dimethylethylammonium; and perchlorates, chlorates, hydrochlorides, bromates, iodates, tetrafluoroborates, sulfates, trifluoromethylsulfates, and sulfonates of alkali metals and alkaline earth metals, such as lithium, sodium, potassium, calcium, and magnesium.

Further, as the polymeric ionic conductive agent, for example, those described in Japanese Unexamined Patent Application Publication No. 9-227717, Japanese Unexamined Patent Application Publication No. 10-120924, Japanese Unexamined Patent Application Publication No. 2000-327922 and Japanese Unexamined Patent Application Publication No. 2005-60658 may be used; however, it is not particularly restricted thereto.

Specific examples of the polymeric ionic conductive agent include those mixtures comprising (A) organic polymer material, (B) ionically conductive polymer or copolymer, and (C) inorganic or a low-molecular-weight organic salt. Here, the component (A) is a polyacrylate ester, polymethacrylate ester, polyacrylonitrile, polyvinyl alcohol, polyvinyl acetate, polyamide such as polyamide 6 or polyamide 12, polyurethane, or polyester, and the component (B) is an oligoethoxylated acrylate or methacrylate, styrene whose aromatic ring is oligoethoxylated, polyether urethane, polyether urea, polyetheramide, polyetheresteramide or polyester-ether block copolymer. The component (C) is an alkali metal, alkaline earth metal, zinc or ammonium salt of an inorganic or low-molecular-weight organic protonic acid, and preferably $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)_2$, $Ca(PF_6)_2$, $Mg(ClO_4)_2$, $Mg(CF_3SO_3)_2$, $Zn(ClO_4)_2$, $Zn(PF_6)_2$, $Ca(CF_3SO_3)_2$ or the like.

Thereamong, a polymeric ionic conductive agent containing a polyetheramide component, polyetheresteramide component or polyester-ether block copolymer component as the component (B) is preferred, and it is also preferred that the polymeric ionic conductive agent additionally contains a low-molecular-weight ionic conductive agent component as the component (C). Further, as such polyetheramide component and polyetheresteramide component, it is particularly preferred that the polyether component contains ($CH_2$—$CH_2$—O) and the polyamide component contains polyamide 12 or polyamide 6. Furthermore, as the low-molecular-weight ionic conductive agent component of the component (C), a polymeric ionic conductive agent containing $NaClO_4$ is particularly preferred. Such polymeric ionic conductive agent is readily available in the market and examples thereof include Irgastat (Registered Trademark) P18 and Irgastat (Registered Trademark) P22 (both are manufactured by Ciba Specialty Chemicals Inc.).

Also preferably used as the polymeric ionic conductive agent in the present invention is a block copolymer constituted by polyolefin blocks and hydrophilic polymer blocks, which are alternatively linked via, for example, an ester bond, amide bond, ether bond, urethane bond or imide bond. Examples of such polyolefin include polyolefins having functional groups, such as a carboxyl group, hydroxyl group and amino group, at both polymer terminals, and polypropylenes and polyethylenes are particularly preferred.

Further, as the hydrophilic polymer, for example, polyether diols such as polyoxyalkylenes having a hydroxyl group as the functional group; polyetheresteramides constituted by a polyamide having a carboxyl group at both terminals and a polyether diol; polyetheramideimides constituted by a polyamideimide and a polyether diol; polyetheresters constituted by a polyester and a polyether diol; and polyetheramides constituted by a polyamide and a polyetherdiamine can be used, and preferred thereamong are polyoxyalkylenes having a hydroxyl group. Examples thereof include polyoxyethylenes (polyethylene glycols) and polyoxypropylenes (polypropylene glycol), which have a hydroxyl group at both terminals.

The block copolymer which can be used as the polymeric ionic conductive agent in the present invention is readily available in the market as, for example, PELESTAT 230, PELESTAT 300 and PELESTAT 303 (all of these are manufactured by Sanyo Chemical Industries, Ltd.). In addition, even in cases where only a small amount of such polymeric ionic conductive agent is added, the antistatic effect can still be maintained by containing a lithium compound, $LiCF_3SO_3$, to the aforementioned block copolymer. An example of such mixture of block copolymer and lithium compound is commercially available Sankonol TBX-310 (manufactured by Sanko Chemical Industry Co., Ltd.).

In the present invention, the aforementioned conductive agent may be used independently or two or more thereof may be appropriately used in combination. For example, an electroconductive agent and ionic conductive agent may be used in combination, and in such a case, the belt can exhibit a stable electroconductivity even against fluctuations in the applied voltage and environmental variations.

As for the amount of the aforementioned conductive agent used, the electroconductive agent is added typically in an amount of not more than 100 parts by mass, for example, 1 to 100 parts by mass, preferably 1 to 80 parts by mass, especially preferably 5 to 50 parts by mass, with respect to 100 parts by mass of the base resin. Further, the ionic conductive agent is added typically in an amount of 0.01 to 10 parts by mass, preferably in the range of 0.05 to 5 parts by mass, with respect to 100 parts by mass of the base resin. Furthermore, the polymeric ionic conductive agent is added typically in an amount of 1 to 500 parts by mass, preferably 10 to 400 parts by mass, with respect to 100 parts by mass of the base resin. In the present invention, it is particularly preferred to add carbon black as the electroconductive material in an amount of 5 to 30 parts by mass with respect to 100 parts by mass of the base resin.

In cases where a polymeric ionic conductive agent is used as the electroconductive material, a compatibilizing agent may be added in order to increase the compatibility between the base resin and the polymeric ionic conductive agent.

Further, in the belt according to the present invention, another functional components can be appropriately blended in addition to the aforementioned components in such a manner that the effects of the present invention are not impaired. For example, various fillers, reinforcing materials, flame retardants, antioxidants, compatibilizing agent, coupling agents, lubricants, surface treatment agents, pigments, ultraviolet absorbing agents, antistatic agents, dispersing agents, neutralizers, foaming agents and cross-linking agents may be appropriately blended. Furthermore, a coloring agent may be added to color the belt.

In addition, the belt according to the present invention may also have a laminated structure in which at least abase layer and surface layer are sequentially overlaid from the inside to the outside (not shown). In such a case, the aforementioned thermoplastic polyalkylene terephthalate resin may be applied in combination with a prescribed resin and/or elastomer to any of the base layer, surface layer and other layers.

The thickness of the electroconductive endless belt according to the present invention is appropriately selected depending on the form of the transfer conveyer belt, intermediate transfer member or the like; however, it is preferably in the range of 50 to 200 µm. In addition, the surface roughness of the electroconductive endless belt according to the present invention is, in terms of the JIS 10-point average roughness (Rz), not greater than 10 µm, preferably not greater than 6 µm, more preferably not greater than 3 µm. Further, it is preferred to adjust the volume resistivity in the range of $10^2$ Ω·cm to $10^{13}$ Ω·cm. Furthermore, the tensile elastic modulus of the belt according to the present invention is preferably not less than 1,000 MPa, more preferably 1,500 to 3,000 MPa.

Figure 1:
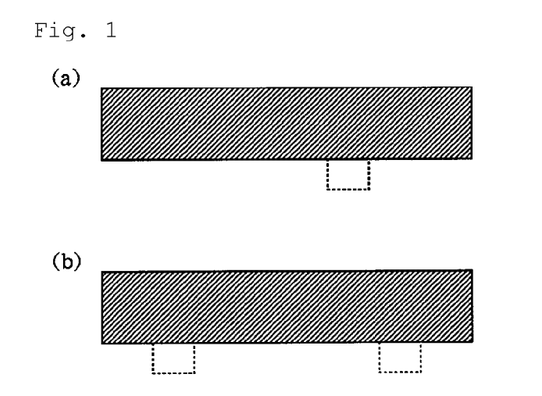
FIG. 1(a) is a cross-sectional view showing an electroconductive endless belt according to one embodiment of the present invention in the width direction in which one row of consecutive protrusions is provided as a fitting part.
FIG. 1(b) is a cross-sectional view showing an electroconductive endless belt according to another embodiment of the present invention in the width direction in which two or more rows of consecutive protrusions are provided as a fitting part.

Further, as indicated by the dashed line in FIG. 1, the electroconductive endless belt according to the present invention may be equipped with a fitting part on the surface of the side contacting a driving member such as the driving roller 9 of the image forming apparatus illustrated in FIG. 2 or the driving roller 30 of FIG. 3, so that the fitting part formed on the driving member (not shown) is interlocked with the fitting part on the belt. In the electroconductive endless belt according to the present invention, by providing such fitting part and allowing it to be interlocked with the fitting part (not shown) of the driving member, the electroconductive endless belt can be driven while preventing a slippage in the width direction thereof.

In this case, the shape of the aforementioned fitting parts is not particularly restricted; however, they are preferably in the form of consecutive protrusions along the circumferential direction (rotation direction) of the belt as illustrated in FIG. 1, and it is preferred that these protrusions be interlocked with recesses formed along the circumferential direction on the circumferential surface of a driving member such as driving roller.

Here, illustrated in FIG. 1(*a*) is an example in which one row of consecutive protrusions is provided as the fitting part; however, this fitting part may be constituted by a plurality of protrusions arranged in a line in the circumferential direction (rotation direction) of the belt. Alternatively, the fitting part may be provided in two or more rows (FIG. 1(*b*)) or the fitting part may be provided in the center in the width direction of the belt. Further, the fitting part may not be in the form of protrusions as shown in FIG. 1, but instead, recesses may be formed along the circumferential direction (rotation direction) of the belt, which recesses are allowed to interlock with protrusions formed along the circumferential direction on the circumferential surface of a driving member such as the aforementioned driving roller.

The electroconductive endless belt according to the present invention can be preferably produced by extrusion molding of a resin composition containing the aforementioned base resin, conductive agent and the like. Specifically, for example, the electroconductive endless belt according to the present invention can be produced by kneading a resin composition containing the aforementioned various blend components using a biaxial kneader and subsequently extrusion-molding the thus obtained kneaded mixture with a circular die. Alternatively, a powder coating method such as electrostatic coating, a dip method or a centrifugal casting method can be suitably employed.

EXAMPLE

The present invention will be described in more detail by way of Examples thereof.

Electroconductive endless belts of each of Examples and Comparative Examples were produced in accordance with the formulations shown in Tables below. Specifically, the blend components were melt-kneaded by a biaxial kneader and the thus kneaded mixture was extruded by an extruder equipped with a prescribed circular die to obtain a single-layer belt having an inner diameter (φ) of 155 mm and a total thickness of 100 µm. Here, the amount of the carbon black blended in each belt was adjusted in such a manner that the volume resistivity was $10^9$ Ω·cm at the measuring voltage of 500 V. The kneading temperature was 250° C. and the extrusion temperature was 260° C. For each of the thus obtained belts of Examples and Comparative Examples, evaluation was carried out in accordance with the procedures described below. The results thereof are collectively shown in Tables below.

<Measurement of the Tensile Elastic Modulus>

The tensile elastic modulus was measured under the following conditions.

Apparatus: Tensile testing machine, EZ test (Analysis software: Trappezium); manufactured by Shimadzu Corporation Samples: in the form of a strip (length 100 mm×width 10 mm×standard thickness 100 μm)

Tensile rate: 5 mm/sec

Data sampling intervals: 100 msec

Measurement method: inclination at 0.5 to 0.6% elongation (in accordance with the JIS tangent method where indicated)

Measuring environment: at room temperature (23±3° C., 55±10% RH)

<Number of Folding Until Breaking>

From each of the thus produced belts, a test piece having a length of 100 mm and width of 15 mm was cut out, and the number of folding until breaking was measured using a MIT flex fatigue resistance tester manufactured by Toyo Seiki Seisaku-sho, Ltd. at the bending rate of 175 times/min, rotation angle of 135° and tensile load of 14.7 N (1.5 kgf). The results are indicated in indices taking the result of Comparative Example 1 as 8,000. A larger the value means a better result.

<Gloss Value>

Each belt was installed in a commercially available laser-beam printer (LBP, tandem-type paper transfer; apparatus having a constitution comparable to FIG. 2), and the gloss value was measured before printing (initial gloss value) and after 20,000 printings (after intensive printing) to determine the percent change in the gloss value in accordance with the following formula. For the measurement of the gloss value, a glossmeter (manufactured by Horiba, Ltd.) was used.

Percent change in the gloss value=the absolute value of(gloss value after intensive use−initial gloss value)/initial gloss value×100(%)

TABLE 1

| | | Example 1 | Example 2 | Example 3 | Example 4 | Example 5 | Example 6 |
|---|---|---|---|---|---|---|---|
| Materials (Parts by mass) | PBT*[1] | 90 | 80 | 60 | 50 | 90 | 60 |
| | PBN*[2] | 10 | 20 | 40 | 50 | 10 | 40 |
| | Polyester elastomer (1)*[3] | — | — | — | — | — | — |
| | Polyester elastomer (2)*[4] | — | — | — | — | — | — |
| | Polyester elastomer (3)*[5] | — | — | — | — | — | — |
| | Carbodiimide compound*[6] | — | — | — | — | 5 | 5 |
| | Carbon black*[7] | 15 | 15 | 17 | 17 | 16 | 18 |
| Belt physical properties | Tensile elastic modulus (MPa) | 2150 | 2100 | 2000 | 1500 | 2100 | 2000 |
| | Number of folding until breaking | 7500 | 7000 | 6000 | 5500 | 9000 | 8000 |
| | Initial gloss value | 90 | 90 | 92 | 91 | 90 | 91 |
| | Gloss value after intensive printing | 60 | 61 | 65 | 66 | 60 | 66 |
| | Percent change in the gloss value (%) | 33.3 | 32.2 | 29.3 | 27.5 | 33.3 | 27.5 |

*[1]PBT: DURANEX 800FP (melting point: 223° C.); manufactured by Polyplastics Co., Ltd.
*[2]PBN: TQB-OT (melting point: 243° C.); manufactured by Tejin Chemicals Ltd.
*[3]Polyester elastomer (1): Pelplene EN-16000 (melting point: 241° C.); manufactured by Toyobo Co., Ltd.
*[4]Polyester elastomer (2): Pelplene EN-5000 (melting point: 233° C.); manufactured by Toyobo Co., Ltd.
*[5]Polyester elastomer (3): Pelplene E-450B (melting point: 222° C.); manufactured by Toyobo Co., Ltd.
*[6]Carbodiimide compound: CARBODILITE E-pellet; manufactured by Nisshinbo Holdings Inc.
*[7]Carbon black: Denka Black granules; manufactured by DENKI KAGAKU KOGYO KABUSHIKI KAISHA.

TABLE 2

| | | Example 7 | Example 8 | Example 9 | Example 10 | Example 11 |
|---|---|---|---|---|---|---|
| Materials (Parts by mass) | PBT*[1] | 50 | 60 | 80 | 80 | 90 |
| | PBN*[2] | 50 | 20 | — | — | — |
| | Polyester elastomer (1)*[3] | — | — | 20 | 20 | — |
| | Polyester elastomer (2)*[4] | — | 20 | — | — | 10 |
| | Polyester elastomer (3)*[5] | — | — | — | — | — |
| | Carbodiimide compound*[6] | 5 | — | — | 5 | — |
| | Carbon black*[7] | 18 | 17 | 14 | 15 | 14 |
| Belt physical properties | Tensile elastic modulus (MPa) | 1900 | 1800 | 1900 | 1900 | 2000 |
| | Number of folding until breaking | 7000 | 9000 | 9000 | >10000 | >10000 |
| | Initial gloss value | 90 | 82 | 88 | 87 | 85 |
| | Gloss value after intensive printing | 55 | 60 | 61 | 60 | 60 |
| | Percent change in the gloss value (%) | 26.7 | 26.8 | 30.7 | 31.0 | 29.4 |

TABLE 3

|  |  | Example 12 | Example 13 | Example 14 | Example 15 | Example 16 |
|---|---|---|---|---|---|---|
| Materials (Parts by mass) | PBT*1 | 80 | 60 | 50 | 90 | 50 |
|  | PBN*2 | — | — | — | — | — |
|  | Polyester elastomer (1)*3 | — | — | — | — | — |
|  | Polyester elastomer (2)*4 | 20 | 40 | 50 | 10 | 50 |
|  | Polyester elastomer (3)*5 | — | — | — | — | — |
|  | Carbodiimide compound*6 | — | — | — | 5 | 5 |
|  | Carbon black*7 | 14 | 14 | 15 | 15 | 16 |
| Belt physical properties | Tensile elastic modulus (MPa) | 1900 | 1600 | 1500 | 2000 | 1600 |
|  | Number of folding until breaking | >10000 | >10000 | >10000 | >10000 | >10000 |
|  | Initial gloss value | 85 | 84 | 82 | 84 | 81 |
|  | Gloss value after intensive printing | 62 | 61 | 61 | 50 | 60 |
|  | Percent change in the gloss value (%) | 27.1 | 27.4 | 25.6 | 28.6 | 25.9 |

TABLE 4

|  |  | Comparative Example 1 | Comparative Example 2 | Comparative Example 3 | Comparative Example 4 |
|---|---|---|---|---|---|
| Materials (Parts by mass) | PBT*1 | 100 | 80 | — | — |
|  | PBN*2 | — | — | 100 | — |
|  | Polyester elastomer (1)*3 | — | — | — | — |
|  | Polyester elastomer (2)*4 | — | — | — | 100 |
|  | Polyester elastomer (3)*5 | — | 20 | — | — |
|  | Carbodiimide compound*6 | — | — | — | — |
|  | Carbon black*7 | 16 | 14 | 17 | 13 |
| Belt physical properties | Tensile elastic modulus (MPa) | 2200 | 1900 | 2000 | 900 |
|  | Number of folding until breaking | 8000 | >10000 | 2000 | >10000 |
|  | Initial gloss value | 92 | 85 | 90 | 80 |
|  | Gloss value after intensive printing | 52 | 51 | 70 | 62 |
|  | Percent change in the gloss value (%) | 43.5 | 40.0 | 22.2 | 22.5 |

As shown in the above Tables, it can be seen that, compared to the belts of Comparative Examples 1 and 2 in which a base resin combination not satisfying the present invention was used, all of the belts of each Example in which a base resin combination satisfying the present invention was used exhibited smaller percent changes in the gloss value after the intensive use. Especially, in the belts of Examples 5 to 7 and 10, an improved number of folding until breaking was attained by the addition of a carbodiimide compound. In contrast, although the belt of Comparative Example 3 exhibited a small percent change in the gloss value, the number of folding until breaking was not sufficient. Further, the belt of Comparative Example 4 also exhibited a small percent change in the gloss value; however, the elastic modulus was low and insufficient.

The invention claimed is:

1. An electroconductive endless belt used in an image forming apparatus,
    wherein base resin of said electroconductive endless belt comprises a polyalkylene terephthalate resin in combination with a naphthalene ring-containing thermoplastic resin,
    wherein the mass ratio of said polyalkylene terephthalate resin to said naphthalene ring-containing thermoplastic resin in said base resin is in the range of 90/10 to 50/50,
    wherein said naphthalene ring-containing thermoplastic resin is a polybutylene naphthalate resin, and
    wherein said base resin further contains a naphthalene ring-containing thermoplastic elastomer having a melting point higher than that of said polyalkylene terephthalate resin.

2. An electroconductive endless belt used in an image forming apparatus,
    wherein base resin of said electroconductive endless belt comprises a polyalkylene terephthalate resin in combination with a naphthalene ring-containing thermoplastic resin and a naphthalene ring-containing thermoplastic elastomer having a melting point higher than that of said polyalkylene terephthalate resin,
    wherein the mass ratio of said polyalkylene terephthalate resin to said naphthalene ring-containing thermoplastic resin and said naphthalene ring-containing thermoplastic elastomer in said base resin is in the range of 90/10 to 50/50.

3. The electroconductive endless belt according to claim 2, wherein said polyalkylene terephthalate resin is a polybutylene terephthalate resin.

4. The electroconductive endless belt according to claim 3, wherein said naphthalene ring-containing thermoplastic resin is a polybutylene naphthalate resin.

5. The electroconductive endless belt according to claim 4, wherein said naphthalene ring-containing thermoplastic elastomer is a polyester-based elastomer.

6. The electroconductive endless belt according to claim 5, wherein said electroconductive endless belt contains a carbodiimide compound.

7. The electroconductive endless belt according to claim 3, wherein said naphthalene ring-containing thermoplastic elastomer is a polyester-based elastomer.

8. The electroconductive endless belt according to claim 3, wherein said electroconductive endless belt contains a carbodiimide compound.

9. The electroconductive endless belt according to claim 2, wherein said naphthalene ring-containing thermoplastic resin is a polybutylene naphthalate resin.

10. The electroconductive endless belt according to claim 9, wherein said naphthalene ring-containing thermoplastic elastomer is a polyester-based elastomer.

11. The electroconductive endless belt according to claim 9, wherein said electroconductive endless belt contains a carbodiimide compound.

12. The electroconductive endless belt according to claim 2, wherein said naphthalene ring-containing thermoplastic elastomer is a polyester-based elastomer.

13. The electroconductive endless belt according to claim 12, wherein said electroconductive endless belt contains a carbodiimide compound.

14. The electroconductive endless belt according to claim 2, wherein said electroconductive endless belt contains a carbodiimide compound.

* * * * *